(12) United States Patent
Rodriguez

(10) Patent No.: US 6,496,106 B1
(45) Date of Patent: Dec. 17, 2002

(54) AUTOMATIC TRUNK RELEASE SYSTEM

(75) Inventor: Alma L. Rodriguez, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/705,199

(22) Filed: Nov. 2, 2000

(51) Int. Cl.$^7$ ................................................ B60Q 1/00
(52) U.S. Cl. ..................... 340/425.5; 340/522; 340/573
(58) Field of Search .............................. 340/425.5, 522, 340/529, 530, 573.1, 584, 588, 426

(56) References Cited

U.S. PATENT DOCUMENTS

| | | | |
|---|---|---|---|
| 5,054,686 A | * 10/1991 | Chuang | 236/49.3 |
| 5,132,663 A | * 7/1992 | Strobl et al. | 340/438 |
| 5,682,145 A | * 10/1997 | Sweetman et al. | 340/632 |
| 5,793,291 A | * 8/1998 | Thornton | 340/573 |
| 6,086,131 A | * 7/2000 | Bingle et al. | 296/76 |
| 6,091,322 A | * 7/2000 | Ang et al. | 340/425.5 |
| 6,130,614 A | * 10/2000 | Miller et al. | 340/573.4 |
| 6,222,442 B1 | * 4/2002 | Gager et al. | 340/426 |

* cited by examiner

Primary Examiner—Jeffery Hofsass
Assistant Examiner—Son Tang
(74) Attorney, Agent, or Firm—Patrick M. Griffin

(57) ABSTRACT

According to the present invention, a system for monitoring an enclosure for a set of parameters and for opening the enclosure upon detecting the set of parameters is provided. The system comprises a sensing device disposed in the enclosure for detecting a plurality of events in the enclosure, a comparator connected to the sensing device for comparing the plurality of events to the set of parameters, a timer connected to the comparator for determining a time elapse of the plurality of events, a signal device connected to the timer for transmitting a signal when the plurality of events reaches or exceeds the set of parameters, and a controller connected to the signal device for receiving the signal and for opening the enclosure. In a preferred embodiment the enclosure comprises a trunk of a vehicle and the parameters include a maximum carbon dioxide gas concentration, a maximum air temperature, and motion.

23 Claims, 2 Drawing Sheets

AUTOMATIC TRUNK RELEASE SYSTEM

TECHNICAL FIELD

The present invention relates generally to unlatching systems and particularly to an automatic vehicle trunk release system which unlatches and opens a vehicle trunk automatically upon detecting prescribed conditions existing within the vehicle trunk.

BACKGROUND OF THE INVENTION

Traditionally, vehicle trunks are accessed manually using, for example, a key-lock system disposed at the rear of the vehicle, a release lever disposed in the interior of the vehicle, or some other remote device located outside the vehicle trunk. Recent developments known in the art teach a manually operated trunk latch release mechanism disposed on the interior of a vehicle trunk operational from inside the vehicle trunk.

It will be appreciated that in certain circumstances an automatic release of a vehicle trunk is desired. Traditional vehicle trunk access systems, however, do not allow for an automatic trunk release thereby requiring an operator to monitor the vehicle trunk for the occurrence of such circumstances and then to manually unlatch and open the vehicle trunk when appropriate. This traditional method of releasing a vehicle trunk in response to certain circumstances demands time and energy from the operator and is subject to failure due to human error.

SUMMARY OF THE INVENTION

According to the present invention, a system for monitoring an enclosure, e.g. a vehicle trunk, for a set of parameters and for opening the enclosure upon detecting the set of parameters is provided. The system comprises a sensing device disposed in the enclosure for detecting a plurality of events in the enclosure, a comparator connected to the sensing device for comparing the plurality of events to the set of parameters, a timer connected to the comparator for determining a time elapse of the plurality of events, a signal device further connected to the comparator for transmitting a signal when the plurality of events reaches or exceeds the set of parameters, and a controller connected to the signal device for receiving the signal and for opening the enclosure.

In a preferred embodiment the enclosure comprises a trunk of a vehicle. The set of parameters comprises a maximum carbon dioxide gas concentration, a maximum air temperature, and the occurrence of motion within the vehicle trunk. Upon detecting the parameters, the system unlatches and opens the vehicle trunk and, further, sounds an alarm to alert those outside the vehicle that an undesirable condition has resulted in the trunk of the vehicle.

BRIEF DESCRIPTION OF THE DRAWINGS

The present invention will now be described, by way of example only, with reference to the accompanying drawings in which.

DETAILED DESCRIPTION OF THE INVENTION

Figure 1:
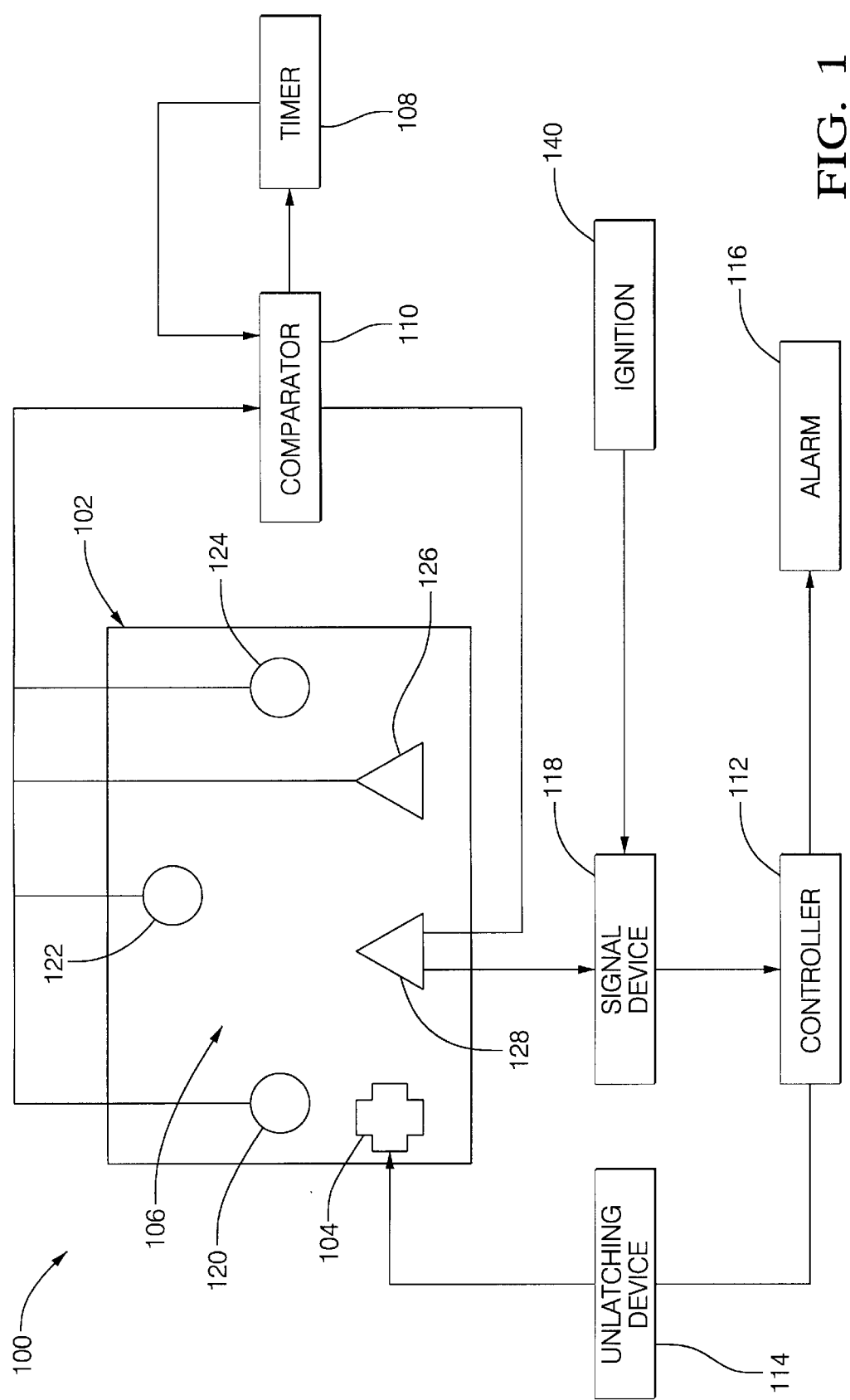
FIG. 1 is a schematic representation of a preferred embodiment of a release system in accordance with the present invention.

Referring now to FIG. 1. FIG. 1 is a schematic representation of a preferred embodiment of an automatic trunk release system 100, in accordance with the present invention. The release system 100 is for use in a vehicle trunk which is generally indicated at 102. The vehicle trunk 102 includes a trunk latch 104 which serves to latch and unlatch the vehicle trunk 102 from a vehicle chassis (not shown).

The release system 100 further includes plurality of sensing devices 106 disposed within the vehicle trunk 102 and a comparator 110 for comparing information from the plurality of sensing devices 106 with stored information. A timer 108 is also provided to measure when certain preselected events occur in the vehicle trunk 102 and the duration of these events. A signal device 118 is in communication with the comparator 110 so that when predetermined conditions exist in the vehicle trunk 102, the signal device 118 sends a signal to a controller 112. The controller then generates a control signal when these predetermined conditions exist in the vehicle trunk 102 and the controller 112 communicates with an unlatching device 114 and an alarm 116. The precise makeup and operation of the release system 100 will be described in greater detail hereinafter.

In one exemplary embodiment, the plurality of sensing devices 106 includes a first gas sensing device 120, a second gas sensing device 122, and a third gas sensing device 124. In one exemplary and preferred embodiment, the first gas sensing device 120 comprises a first carbon dioxide sensing device, the second gas sensing device 122 comprises a second carbon dioxide sensing device and the third gas sensing device 124 comprises a third carbon dioxide sensing device. The first, second, and third carbon dioxide sensing devices 120, 122, and 124, respectively, are disposed in the vehicle trunk 102 in preselected positions to optimize carbon dioxide detection within the vehicle trunk 102. The first carbon dioxide sensing device 120 may, in a preferred embodiment of the present invention, be disposed on a first sidewall (not shown) of the vehicle trunk 102. The second carbon dioxide sensing device 122 may be disposed on a second sidewall (not shown) opposite the first carbon dioxide sensing device 120. The third carbon dioxide sensing device 124 may be disposed on a trunk door (not shown) on the inside of the vehicle trunk 102. The first, second, and third carbon dioxide sensing devices 120, 122, and 124 may be of a type known in the art for detecting the carbon dioxide concentration of a cubic area of air comparable to that area found in the vehicle trunk 102. The first, second, and third carbon dioxide sensing devices 120, 122, and 124 are connected to the comparator 110, as is discussed further herein below.

The plurality of sensing devices 106 of the system 100 further includes a temperature sensing device 126 and a motion detecting device 128. The temperature sensing device 126 is disposed within the vehicle trunk 102 in a position preselected to facilitate air temperature detection and monitoring. The temperature sensing device 126 may be any temperature sensor known in the art suitable for detecting the ambient air temperature within the vehicle trunk 102. In one embodiment, the temperature sensing device 126 may comprise an air temperature sensor commercially available as 'Manifold Air Temperature Sensor' by Delphi Automotive Systems. In another embodiment, the temperature sensing device 126 may comprise a sensor commercially available as 'Mini-Inlet Air Temperature Sensor' also produced by Delphi Automotive Systems. The temperature sensing device 126 is also connected to the comparator 110, as is discussed further herein below.

The motion detecting device 128 is disposed within the vehicle trunk 102 in a position preselected to facilitate the detection of motion occurring within the vehicle trunk 102 of a vehicle. The motion detecting device 128 comprises any number of suitable motion sensors known in the art including, but not limited to, a three-hundred and sixty degree vision sensor. The motion detecting device 128 is in communication with both the comparator 110 and the signal device 118.

Referring again to FIG. 1, the first carbon dioxide sensing device 120, the second carbon dioxide sensing device 122, and the third carbon dioxide sensing device 124 are each connected to the comparator 110. The temperature sensing device 126 is also connected to the comparator 110.

The comparator 110 is designed so that a predetermined carbon dioxide gas concentration limit, a predetermined air temperature limit, and a predetermined time limit are stored in the memory thereof. The comparator 110 is thus designed so that it receives a first signal from the first carbon dioxide sensing device 120, a second signal from the second carbon dioxide sensing device 122, and a third signal from the third carbon dioxide sensing device 124 whereby the first, second, and third signals are representative of the first, second, and third measured carbon dioxide values, respectively. The comparator 110 then compares each of the first, second, and third carbon dioxide signals with the stored predetermined carbon dioxide gas concentration limit. The stored predetermined carbon dioxide gas concentration limit may be programmed into the comparator 110. In one exemplary embodiment, the programmed carbon dioxide gas concentration limit comprises a concentration limit that an individual of a given, preselected age may consume before having intoxication problems.

The comparator 110 further receives a temperature signal from the temperature sensing device 126. The temperature signal is representative of a measured air temperature determined by the temperature sensing device 126. The comparator 110 then compares the first temperature signal with the stored predetermined air temperature limit. The comparator 110 is in direct communication with the motion detecting device 128 as depicted in FIG. 1.

The timer 108 communicates directly with the comparator 110. The timer 108 serves to time the occurrence of certain events taking place in the vehicle trunk 102 and to communicate that time value to the comparator 110. The comparator 110 compares the time value to the predetermined minimum time value programmed and stored within the comparator 110.

The signal device 118 is designed to generate a plurality of signals in response to predetermined existing vehicle conditions. The signal device 118 generates and sends an activation signal to the controller 112 upon sensing that an ignition device 140 of the vehicle has been turned off. The activation signal instructs the system 100 to begin monitoring the vehicle trunk 102 as explained herein. The signal device 118 generates and sends an unlatch signal to the controller 112 when the motion detecting device 128 senses motion within the trunk 102. The unlatch signal instructs the controller 112 to cause the unlatching of the vehicle trunk 102 by utilizing and communicating with the unlatching device 114. The signal device 118 also generates an alarm signal which is communicated to the controller 112 instructing the controller 112 to empower the alarm 116 thereby emitting an audible sound. The signal device 118 finally generates a deactivation signal upon sensing that the vehicle ignition device 140 has been turned off. The deactivation signal instructs the controller 112 to deactivate the system 100.

The controller 112 comprises the central control unit of the vehicle. In a preferred embodiment of the present invention, the controller 112 may comprise a power train control module (PCM) common in the art which, upon receiving a plurality of signals from the signal device 118, empowers the system 100 accordingly, as is described herein above.

The unlatching device 114 may comprise any of a plurality of trunk release systems common in the art and suitable for the application described herein in accordance with the present invention. The alarm 116 may comprise a device for alerting those outside the vehicle that an undesirable condition has been established within the vehicle trunk 102. The alarm 116, for example, may include a sounding device (not shown) that sounds repeatedly upon the system 100 detecting an undesirable condition within the vehicle trunk 102. In a preferred embodiment of the present invention, the sounding device may include, for purposes of example only and not limitation, a horn of the vehicle, a sounding portion of the theft prevention system of the vehicle should the vehicle contain such a system, an independent sound producing device, etc.

The use of the automatic trunk release system 100, in accordance with the present invention, will now be described. The plurality of sensors 106 disposed in the vehicle trunk 102 monitors and detects the occurrence of events within the vehicle trunk 102. Particularly, the first carbon dioxide sensing device 120, the second carbon dioxide sensing device 122, and the third carbon dioxide sensing device 124 monitor the concentration of carbon dioxide gas in the air at different locations within the vehicle trunk 102, the temperature sensing device 126 monitors the air temperature within the vehicle trunk 102, and the motion detector 128 monitors motion within the vehicle trunk 102.

The comparator 110 receives a first signal from the first carbon dioxide sensing device 120, a second signal from the second carbon dioxide sensing device 122, and a third signal from the third carbon dioxide sensing device 124 in which the first, second, and third signals are representative of the first, second, and third measured carbon dioxide values, respectively. The comparator 110 compares each of the first, second, and third carbon dioxide signals with the stored predetermined carbon dioxide gas concentration limit.

If neither of the first, second, and third carbon dioxide signals is equal to or exceeds the stored predetermined carbon dioxide gas concentration limit then the first, second, and third carbon dioxide sensing devices 120, 122, and 124, respectively, continue monitoring the measured concentration of carbon dioxide in the air of the vehicle trunk 102 and communicate the measured concentration to the comparator 110. If, however, one of the first, second, and third measured carbon dioxide values is equivalent to or exceeds the stored predetermined carbon dioxide gas concentration limit then the comparator 110 reads a temperature signal from the temperature sensing device 126 representative of the air temperature value measured by the temperature sensing device 126.

The comparator 110 compares the temperature signal, received from the air temperature sensing device 126, with the stored predetermined air temperature limit. If the temperature signal is less than the predetermined air temperature limit then the system 100 continues to monitor the measured carbon dioxide concentration in the air of the vehicle trunk 102 by means of the first, second, and third carbon dioxide sensing devices 120, 122, and 124, respectively, as is discussed herein above. If, however, the measured air temperature signal in the vehicle trunk 102 is equivalent to or exceeds the maximum allowable air temperature then the timer 108 is employed.

The timer 108 determines a first time value comprising the period of time in which the first, second, and third carbon dioxide concentration signals are greater than or equal to the stored predetermined carbon dioxide gas concentration limit. In one exemplary embodiment, the first time value is about 30 seconds. The timer 108 further determines a second time value comprising the period of time in which the temperature signal is greater than or equal to the stored predetermined air temperature limit. In one exemplary embodiment, the second time value is about 30 seconds. It will be appreciated that the first and second time values may be the same or may be different. If the first time value and the second time value are each greater than or equal to the predetermined time limit then the system 100 employs the motion detecting device 128. Furthermore, the stored time values may be programmed so that they account for the time needed to eliminate all carbon dioxide residual from combustion in the trunk (normal operation of the vehicle) once the engine is stopped. Thus, there can be a programmed delay to account for this normal time period in which the residual carbon dioxide is eliminated naturally.

The motion detecting device 128 is designed to detect motion within the vehicle trunk 102 of the vehicle. The signal device 118 is connected to the motion detecting device 128. If the motion detecting device 128 senses movement within the vehicle trunk 102 then the signal device 118 instructs the controller 112 of the vehicle to activate the unlatching device 114 to unlatch and open the vehicle trunk 102. The signal device 118 further instructs the controller 112 to activate the alarm 116 to alert those outside the vehicle that an undesirable condition has occurred within the vehicle trunk 102. The controller 112 continues activation of the unlatching device 114 and the alarm 116 until the vehicle ignition device 140 is turned on whereby the signal device 118 detects that the vehicle ignition device 140 is actuated and subsequently sends a signal to the controller 112 instructing the controller 112 to deactivate the system 100. When the vehicle ignition device 140 is turned off the signal device 118 sends an activation signal to the controller 112 instructing the controller 112 to activate the system 100 thus commencing monitoring of the vehicle trunk 102 by the plurality of sensing devices 106.

Figure 2:
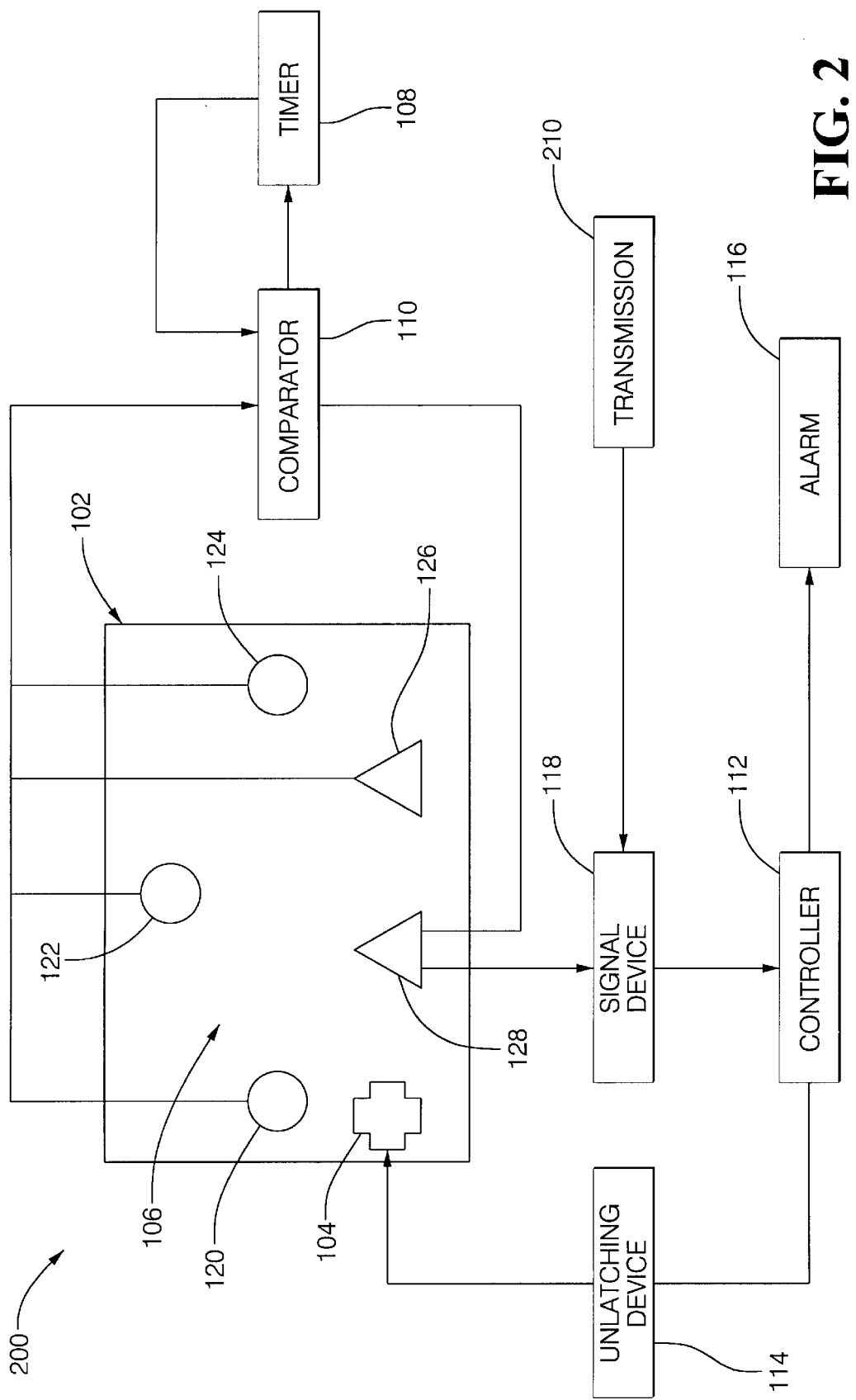
FIG. 2 is a schematic representation of a second embodiment of a release system in accordance with the present invention.

FIG. 2 shows a schematic of a second embodiment of the automatic trunk release system, indicated generally at 200, in accordance with the present invention. The system 200 is substantially similar to the system 100 depicted in FIG. 1 except that the vehicle ignition device 140 of the system 100 is not included in the system 200. In place of the vehicle ignition device 140, the system 200 includes a vehicle transmission monitor system 210, as is discussed herein.

To preserve brevity and to avoid confusion, description of all of the elements of the system 200 and the workings thereof will be, for the most part, omitted in lieu of the description of the system 100 discussed herein above with reference to FIG. 1.

The vehicle transmission monitor system 210 communicates an activation signal to the signal device 118 when a vehicle transmission assembly (not shown) is in a park mode. Upon receiving the activation signal, the signal device 118 instructs the controller 112 to activate the system 200, and thus the first, second, and third carbon dioxide sensing devices, 120, 122, and 124 begin monitoring the vehicle trunk 102 for air concentration of carbon dioxide gas. The vehicle transmission monitor system 210 further communicates a deactivation signal to the signal device 118 when the vehicle transmission monitor system 210 is moved into a drive operating mode. Upon receiving the deactivation signal the signal device 118 instructs the controller 112 to deactivate the vehicle transmission monitor system 200 thus ceasing the monitoring of the vehicle trunk 102 and deactivating the unlatching device 114 and the alarm 116 if activated by the controller 112.

In one embodiment, the vehicle transmission monitor system 210 is linked to a traditional automatic transmission system known in the art. A sensor (not shown) will monitor the position of the shift lever (not shown) of the automatic transmission monitor system 210. The activation signal will be sent from the automatic transmission monitor system 210 to the signal device 118 when the sensor detects the shift lever in the park setting. The deactivation setting will be sent to the signal device 118 when the sensor detects the shift lever positioned out of the park setting.

According to the present invention a release system having a simple yet effective design is provided for monitoring a vehicle trunk for any number of parameters so that the upon occurrence of predetermined events within the vehicle trunk, the vehicle trunk will automatically unlatch and an alarm optionally sounds. The system of the present invention is easily retrofittable to existing vehicle or may be provided in new vehicles. Because the system involves few parts, the system may be conveniently disposed within the vehicle trunk without any undue burden.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims

What is claimed is:

1. A system for monitoring a compartment and opening the compartment when predetermined conditions exist in the compartment, the system comprising:

a first sensor for measuring a first parameter, the first sensor being disposed within the compartment;

a second sensor for measuring a second parameter, the second sensor being disposed within the compartment;

a comparator in communication with the first and second sensors, wherein the comparator compares the measured first parameter to a predetermined stored first parameter and if the measured first parameter exceeds the value of the predetermined stored first parameter the comparator compares the measured second parameter to a predetermined stored second parameter if the measured second parameter exceeds the value of the predetermined stored second parameter;

a timer communicating with the comparator for determining a first time elapse and a second time elapse, the first time elapse corresponding to the period said first measured parameter exceeds said predetermined stored first parameter and the second time elapse corresponding to the period said second measured parameter exceeds said predetermined stored second parameter, the comparator compares the first time elapse to a first predetermined time elapse and the second time elapse to a second predetermined time elapse, if said first time elapse and said second time elapse exceed said first predetermined time elapse and said second predetermined time elapse, respectively, a signal device communicating with the comparator generates a control signal for receipt by a controller communicating with the signal device, wherein the controller causes the compartment to open in response to receiving the control signal.

2. The system of claim 1, wherein the first sensor comprises a carbon dioxide sensor and the second sensor is a temperature sensor.

3. The system of claim 2, wherein the compartment is a vehicle trunk.

4. The system of claim 3, wherein the controller communicates with an unlatching device for unlatching of the compartment upon receipt of said control signal.

5. The system of claim 1, further including:
an alarm device which is in communication with the controller wherein in response to receiving the control signal the alarm device emits an audible sound.

6. The system of claim 1, further including:
an ignition device for sensing the ignition of a vehicle in which the compartment is present in the form of a vehicle trunk, the ignition device being adapted to determine whether an engine of the vehicle is running and the ignition device sends a signal to disable the system and prevent the controller from sending the control signal to unlatch the compartment.

7. The system of claim 1, further including:
a motion detecting device disposed within the compartment, the motion detecting device is adapted for sensing motion within the compartment, the motion detecting device generating a motion signal when motion is detected within the compartment, the motion signal being communicated to the signal device so that the control signal is generated only when motion is detected in the compartment, the motion detecting device being activated if said first time elapse and said second time elapse exceed said first predetermined time elapse and said second predetermined time elapse respectively.

8. The system of claim 1, wherein the controller is a central processing unit of a vehicle.

9. The system of claim 1, further including:
a device for sensing a transmission mode of a vehicle in which the compartment is included in the form of a vehicle trunk, wherein the system is disabled when the transmission mode is not in a passive mode so as to prevent the controller from sending the control signal to unlatch the compartment.

10. A method for monitoring and unlatching a trunk compartment of a vehicle when first predetermined conditions are observed in the trunk compartment, comprising:
sensing a first parameter within the trunk compartment, comparing the sensed first parameter to a stored first parameter and sensing a second parameter within the trunk compartment, when the sensed first parameter exceeds said stored first parameter and comparing the sensed second parameter to a stored second parameter and determining a first elapsed time period and a second elapsed time period when the sensed second parameter exceeds the stored second parameter, said first time period representing when the sensed first parameter is equal to or greater than the stored first parameter and the second elapsed time period representing when the sensed second parameter is equal to or greater than the stored second parameter;
generating a control signal when the first elapsed time period is equal to or greater than a stored first time limit and when the second elapsed time period is equal to or greater than a stored second time limit; and
unlatching the trunk compartment and sounding an audible alarm in response to the control signal.

11. The method as in claim 10, wherein the first parameter is a carbon dioxide measurement within the trunk compartment, and the second parameter is a temperature measurement within the trunk compartment.

12. The method as in claim 11, wherein the stored first value is a carbon dioxide concentration limit for the trunk compartment and the stored second value is a temperature limit for the trunk compartment.

13. The method as in claim 10, wherein the unlatching of the trunk compartment comprises:
sending the control signal to an unlatching device which causes the unlatching of the trunk compartment.

14. The method as in claim 10, further including:
activating a motion detecting device within the compartment, said motion detecting device sensing motion within the compartment, said motion detecting device being activated after the first elapsed time period is equal to or greater than a stored first time limit and when the second elapsed time period is equal to or greater than a stored second time limit; and
generating a motion signal when motion is detected within the compartment, the control signal being generated only when motion is detected within the compartment.

15. The method as in claim 10, further including:
monitoring the ignition of the vehicle in which the trunk compartment is present, the ignition device being adapted to determine whether an engine of the vehicle is running and the ignition device sends a signal to disable the system and prevent the activation of the unlatching mechanism.

16. The method as in claim 10, further including:
monitoring a transmission mode of the vehicle in which the trunk compartment is present, wherein the system is disabled when the transmission mode is not in a passive mode so as to prevent the activation the unlatching mechanism.

17. An automatic release system for opening an enclosed compartment of a vehicle, comprising:
a carbon dioxide sensor positioned to measure the carbon dioxide level in the enclosed compartment, said carbon dioxide sensor providing a first signal indicative of the carbon dioxide level;
a temperature sensor positioned to measure the temperature level in the enclosed compartment, said temperature sensor providing a second signal indicative of the temperature within the enclosed compartment;
a comparator for receiving said first signal and said second signal, said comparator comparing said first signal to a first predetermined level and if said first signal exceeds said first predetermined level, said comparator compares said second signal to a second predetermined level and if said second signal exceeds said second predetermined level, said comparator activates a timing device for providing a first time interval and a second time interval, said first time interval corresponding to the period of time said first signal is greater than or equal to said first predetermined level and said second time interval corresponding to the period of time said second signal is greater than or equal to said second predetermined level, said comparator compares said first time interval to a first predetermined time limit and said second time interval to a second predetermined time limit and said comparator provides an enable signal if said first time interval and said second time interval are greater than or equal to said first predetermined time limit and said second predetermined time limit respectively;

a motion detecting device positioned to detect motion within the enclosed compartment, said motion detecting device upon receipt of said enable signal provides a third signal indicative of motion with the enclosed compartment; and a system controller being configured to receive said third signal and activate an unlatching mechanism if said third signal it is indicative of motion within the enclosed compartment.

18. The automatic release mechanism as in claim 17 further comprising: a plurality of carbon dioxide sensors each being positioned to provide a signal indicative of the carbon dioxide level in the enclosed compartment, said comparator comparing each signal to said first predetermined level.

19. The automatic release mechanism as in claim 17, wherein said first predetermined time interval accounts for the period of time necessary for residual carbon dioxide in the enclosed compartment to dissipate.

20. The automatic release mechanism as in claim 19, wherein said second predetermined time interval accounts for the period of time necessary for the temperature in the enclosed compartment to stabilize.

21. The automatic release mechanism as in claim 17, further including:

a device for sensing a transmission mode of the vehicle in which the enclosed compartment is included in the form of a vehicle trunk, wherein the system is disabled when the transmission mode is not in a passive mode so as to prevent the controller from activating the unlatching mechanism.

22. The automatic release mechanism as in claim 21, further including:

an ignition device for sensing the ignition of a vehicle in which the enclosed compartment is present in the form of a vehicle trunk, the ignition device being adapted to determine whether an engine of the vehicle is running and the ignition device sends a signal to disable the system and prevent the controller from activating the unlatching mechanism.

23. The automatic release mechanism as in claim 17, further including:

an ignition device for sensing the ignition of a vehicle in which the enclosed compartment is present in the form of a vehicle trunk, the ignition device being adapted to determine whether an engine of the vehicle is running and the ignition device sends a signal to disable the system and prevent the controller from activating the unlatching mechanism.

* * * * *